(12) United States Patent
Teyssier et al.

(10) Patent No.: US 10,977,044 B2
(45) Date of Patent: Apr. 13, 2021

(54) EXECUTING BRANCH INSTRUCTIONS FOLLOWING A SPECULATION BARRIER INSTRUCTION

(71) Applicant: Arm Limited, Cambridge (GB)

(72) Inventors: Remi Marius Teyssier, Le Bar sur Loup (FR); Luca Nassi, Antibes (FR); Albin Pierrick Tonnerre, Nice (FR); François Donati, Antibes (FR)

(73) Assignee: Arm Limited, Cambridge (GB)

( * ) Notice: Subject to any disclaimer, the term of this patent is extended or adjusted under 35 U.S.C. 154(b) by 40 days.

(21) Appl. No.: 16/561,383

(22) Filed: Sep. 5, 2019

(65) Prior Publication Data

US 2020/0117464 A1 Apr. 16, 2020

(30) Foreign Application Priority Data

Oct. 15, 2018 (GB) ...................................... 1816741

(51) Int. Cl.
*G06F 9/38* (2018.01)
*G06F 9/30* (2018.01)
*G06F 21/55* (2013.01)

(52) U.S. Cl.
CPC ........ *G06F 9/3842* (2013.01); *G06F 9/30087* (2013.01); *G06F 9/3844* (2013.01); *G06F 21/556* (2013.01)

(58) Field of Classification Search
CPC .. G06F 9/3842; G06F 9/30087; G06F 9/3834; G06F 9/3844; G06F 9/3836; G06F 21/54; G06F 21/556; G06F 21/75
See application file for complete search history.

(56) References Cited

U.S. PATENT DOCUMENTS

2009/0089564 A1 4/2009 Brickell et al.
2019/0042263 A1* 2/2019 Sukhomlinov ..... G06F 9/30058
(Continued)

FOREIGN PATENT DOCUMENTS

WO 2019/005975 1/2019

OTHER PUBLICATIONS

Richard Grisenthwaite, "Cache Speculation Side-channels", Jan., Arm Limited, pp. 1-13 (Year: 2018).*
(Continued)

*Primary Examiner* — Aimee Li
*Assistant Examiner* — Courtney P Carmichael-Moody
(74) *Attorney, Agent, or Firm* — Nixon & Vanderhye P.C.

(57) ABSTRACT

An apparatus comprising processing circuitry is provided, the processing circuitry comprising execution circuitry, commit circuitry, issue circuitry comprising an issue queue and selection circuitry, and a branch predictor. The processing circuitry is configured to identify a speculation barrier instruction in the commit queue. While an entry in the commit queue identifies a speculation barrier instruction, when a branch instruction that follows the speculation barrier instruction in the program order is selected for issue, the processing circuitry performs a first execution of the instruction, inhibiting updating of branch prediction data items associated with the branch instruction and inhibiting the selection circuitry from invalidating the associated issue queue entry. When the speculation barrier instruction completes, the processing circuitry is configured to perform a second execution of the instruction, updating the branch prediction data items associated with the branch instruction and allowing the issue circuitry to invalidate the associated issue queue entry.

14 Claims, 8 Drawing Sheets

(56) References Cited

U.S. PATENT DOCUMENTS

| | | | |
|---|---|---|---|
| 2019/0050230 A1 | 2/2019 | Branco et al. | |
| 2019/0114422 A1* | 4/2019 | Johnson | G06F 9/3865 |
| 2019/0324756 A1* | 10/2019 | Chappell | G06F 9/3842 |
| 2019/0332384 A1* | 10/2019 | Calhoun | G06F 12/1425 |
| 2020/0065112 A1* | 2/2020 | Gotze | G06F 9/30058 |
| 2020/0372129 A1* | 11/2020 | Gupta | G06F 21/577 |

OTHER PUBLICATIONS

Robert N. M. Watson, Jonathan Woodruff, Michael Roe, Simon W. Moore and Peter G. Neumann, "Capability Hardware Enhanced RISC Instructions (CHERI): Notes on the Meltdown and Spectre Attacks", Feb., University of Cambridge Computer Laboratory, pp. 3-14 (Year: 2018).*

Intel, "Intel Analysis of Speculative Execution Side Channels", Jan. 2018, 12 pages.

Combined Search and Examination Report for GB1816741.1 dated Apr. 9, 2019, 6 pages.

* cited by examiner

EXECUTING BRANCH INSTRUCTIONS FOLLOWING A SPECULATION BARRIER INSTRUCTION

This application claims priority to GB Patent Application No. 1816741.1 filed Oct. 15, 2018, the entire content of which is hereby incorporated by reference.

BACKGROUND

Technical Field

The present technique relates to the field of data processing systems. More particularly, it relates to branch prediction mechanisms.

Technical Background

Some data processing systems are susceptible to malicious attacks due to cache timing side-channels. The basic principle behind cache timing side-channels is that the pattern of allocations into the cache, and, in particular, which cache sets have been used for the allocation, can be determined by measuring the time taken to access entries that were previously in the cache, or by measuring the time to access the entries that have been allocated. This then can be used to determine which addresses have been allocated into the cache.

One feature of speculation-based cache timing side-channels is their use of speculative memory reads. Speculative memory reads are typical of advanced micro-processors and part of the overall functionality which enables very high performance. By performing speculative memory reads to cacheable locations beyond an architecturally unresolved branch (or other change in program flow), and, further, the result of those reads can themselves be used to form the addresses of further speculative memory reads. These speculative reads cause allocations of entries into the cache whose addresses are indicative of the values of the first speculative read.

This becomes an exploitable side-channel if untrusted code is able to control the speculation in such a way it causes a first speculative read of location which would not otherwise be accessible at that untrusted code. But the effects of the second speculative allocation within the caches can be measured by that untrusted code.

One example of a mechanism for exploiting such cache timing side-channels makes use of branch predictors. Modern processors have a variety of different mechanisms for branch prediction that cause the processor to speculatively change the instruction stream in response to predictions of the directions of future branches. The forms of such branch predictors are not described by the architecture, and implementations can employ a variety of different mechanisms to speculate the changes of instruction stream.

In order to give high-performance execution, these predictors are designed to use the history of previous branches to speculate the change of instruction stream. The resulting speculation can take considerable time to be resolved. This delay in resolution can result in the processor performing speculative memory accesses, and so cause allocation into the caches.

In some implementations, the history of previous branches used to drive the speculation is not filtered by the exception level that the processor was in. Therefore, it is possible for the code running at one exception level to train the branch predictors in a manner that causes other exception levels (or other contexts) to perform speculative memory accesses. This can then be used to stimulate the speculation-based cache timing side-channel by having a lower exception level train the branch predictors to influence the speculative instruction stream of a higher exception level, or in a different context, to read data otherwise inaccessible at the lower exception level, and additionally to allocate items speculatively into the caches based on that data. Code running at the lower exception level can then examine the impact of cache allocations, so exploiting the cache timing side-channel.

As advanced implementations can typically have multiple outstanding speculative changes of address stream caused by branch prediction, in principle it is possible to string together a number of different pieces of privileged code using the trained predictions of the branch predictor—to construct sequences to read arbitrary data and use this data to form the addresses to allocate into the caches.

A number of mechanisms have been proposed to overcome or reduce the risk of such side-channel effects. One such proposed mechanism is a speculation barrier instruction. A speculation barrier instruction prevents any instruction appearing later in the program order than the barrier from being executed speculatively, until the speculation barrier instruction completes. In particular, the presence of a speculation barrier instruction prevents instructions following the barrier from causing speculative allocation into any caching structure.

This provides a mechanism by which speculation can be controlled, improving the resilience of the system against cache timing side-channels. However, preventing the speculative execution of instructions may have negative performance effects, potentially negating any performance benefits associate with branch prediction. It would thus be beneficial to provide a mechanism to improve the performance of a processing system under the influence of a speculation barrier instruction.

SUMMARY

Viewed from one aspect, the present technique provides an apparatus comprising:

processing circuitry comprising: execution circuitry to execute processing operations in response to program instructions having a program order, commit circuitry comprising a commit queue to store a plurality of commit queue entries identifying respective instructions in the program order and issue circuitry comprising an issue queue and selection circuitry, in which the issue queue comprises a plurality of issue queue entries, each issue queue entry identifying a pending instruction awaiting execution by the execution circuitry, and the selection circuitry is configured to select pending instructions from the issue queue to issue to the execution circuitry for execution in an execution order, the processing circuitry being configured to identify a speculation barrier instruction in the commit queue; and a branch predictor to predict the outcome of branch instructions according to one or more branch prediction data items;

in which:

while one of the plurality of commit queue entries identifies a speculation barrier instruction, in response to the selection circuitry selecting for issue a branch instruction that follows the speculation barrier instruction in the program order, the processing circuitry is configured to perform a first execution of the branch instruction, in which the first execution comprises the processing circuitry inhibiting updating of one or more branch prediction data items associated with the branch instruction and inhibiting the selection circuitry from invalidating the issue queue entry identifying the branch instruction; and in response to completion of execution of the speculation barrier instruction, the processing circuitry is configured to perform a second execution of the branch instruction to update the one or more branch prediction data items associated with the branch instruction, the selection circuitry being configured to invalidate the issue queue entry identifying the branch instruction in response to completion of the second execution.

Viewed from a further aspect there is provided a method comprising:

storing, in a commit queue, a plurality of commit queue entries identifying respective instructions in a program order;

selecting pending instructions from an issue queue to issue to execution circuitry for execution in an execution order, the issue queue comprising a plurality of issue queue entries, each issue queue entry identifying a pending instruction awaiting execution by the execution circuitry;

executing processing operations in response to program instructions;

predicting the outcome of branch instructions according to one or more branch prediction data items;

while one of the plurality of commit queue entries identifies a speculation barrier instruction, in response to selecting for issue a branch instruction that follows the speculation barrier instruction in the program order, performing a first execution of the branch instruction, the first execution inhibiting updating of one or more branch prediction data items associated with the branch instruction and inhibiting selection circuitry from invalidating the issue queue entry identifying the branch instruction; and in response to completion of execution of the speculation barrier instruction, performing a second execution of the branch instruction to update the one or more branch prediction data items associated with the branch instruction, and invalidating the issue queue entry identifying the branch instruction in response to completion of the second execution.

Viewed from a further aspect there is provided an apparatus comprising: means for processing data, comprising: means for executing processing operations in response to program instructions having a program order, means for storing a plurality of commit queue entries identifying respective instructions in the program order, means for storing a plurality of issue queue entries, each issue queue entry identifying a pending instruction awaiting execution by the means for executing, and means for selecting pending instructions from the means for storing a plurality of issue queue to issue to the means for executing for execution in an execution order, the means for processing being configured to identify a speculation barrier instruction in the means for storing a plurality of commit queue entries; and a means for predicting the outcome of branch instructions according to one or more branch prediction data items;

in which:

while one of the plurality of commit queue entries identifies a speculation barrier instruction, in response to selecting, by the means for selecting, a branch instruction for issue that follows the speculation barrier instruction in the program order, the means for processing is configured to perform a first execution of the branch instruction, in which the first execution comprises the means for processing inhibiting updating of one or more branch prediction data items associated with the branch instruction and inhibiting the means for selecting from invalidating the issue queue entry identifying the branch instruction; and in response to completion of execution of the speculation barrier instruction, the means for processing is configured to perform a second execution of the branch instruction to update the one or more branch prediction data items associated with the branch instruction, the means for selecting being configured to invalidate the issue queue entry identifying the branch instruction in response to completion of the second execution.

Further aspects, features and advantages of the present technique will be apparent from the following description of examples, which is to be read in conjunction with the accompanying drawings.

DESCRIPTION OF EXAMPLES

Figure 1:
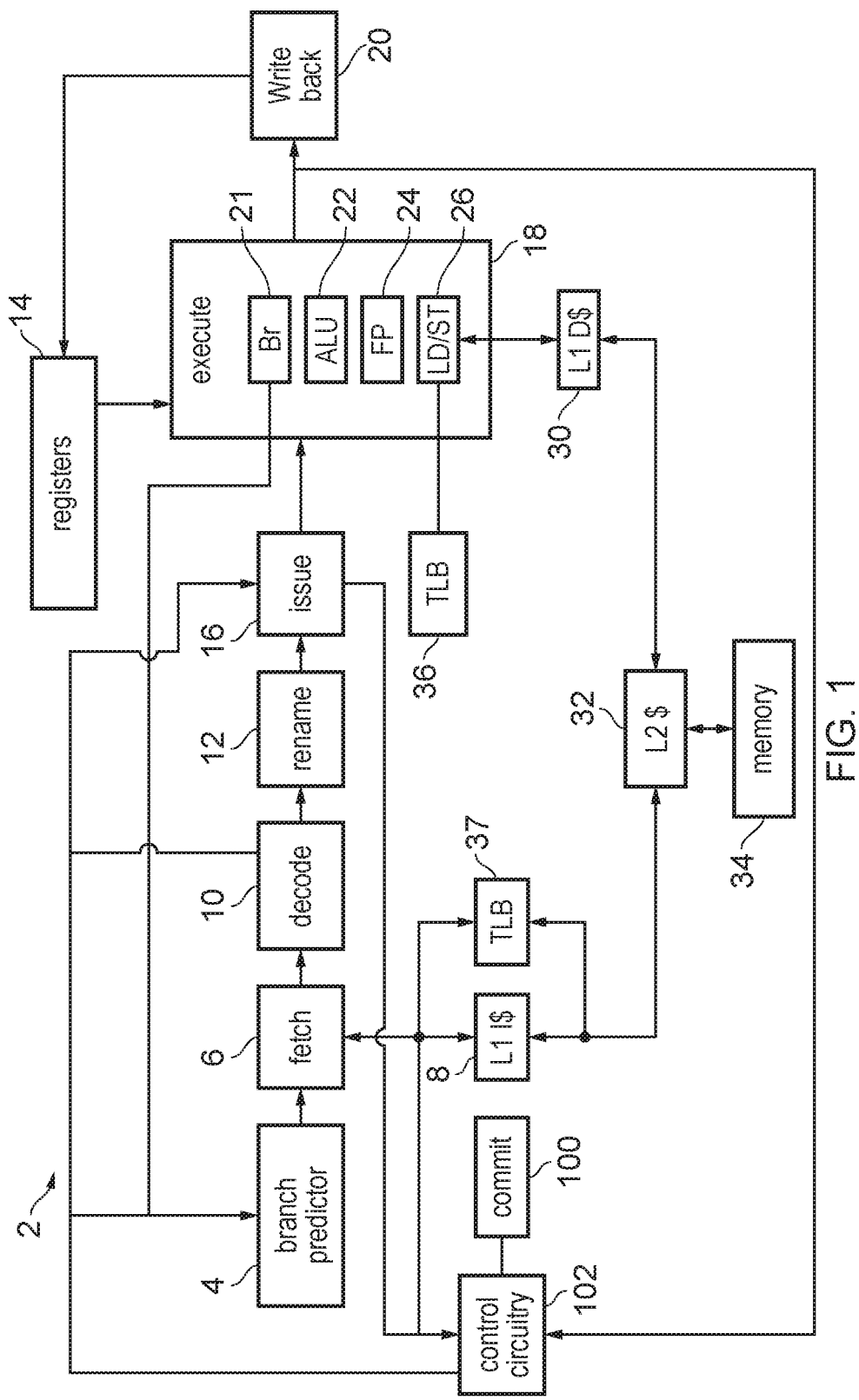
FIG. 1 shows a schematic representation of a data processing system in accordance with one example of the present technique.

In some examples of the present technique there is provided an apparatus comprising processing circuitry comprising: execution circuitry to execute processing operations in response to program instructions having a program order, commit circuitry comprising a commit queue to store a plurality of commit queue entries identifying respective instructions in the program order and issue circuitry comprising an issue queue and selection circuitry, in which the issue queue comprises a plurality of issue queue entries, each issue queue entry identifying a pending instruction awaiting execution by the execution circuitry, and the selection circuitry is configured to select pending instructions from the issue queue to issue to the execution circuitry for execution in an execution order, the processing circuitry being configured to identify a speculation barrier instruction in the commit queue; and a branch predictor to predict the outcome of branch instructions according to one or more branch prediction data items; in which: while one of the plurality of commit queue entries identifies a speculation barrier instruction, in response to the selection circuitry selecting for issue a branch instruction that follows the speculation barrier instruction in the program order, the processing circuitry is configured to perform a first execution of the branch instruction, in which the first execution comprises the processing circuitry inhibiting updating of one or more branch prediction data items associated with the branch instruction and inhibiting the selection circuitry from invalidating the issue queue entry identifying the branch instruction; and in response to completion of execution of the speculation barrier instruction, the processing circuitry is configured to perform a second execution of the branch instruction to update the one or more branch prediction data items associated with the branch instruction, the selection circuitry being configured to invalidate the issue queue entry identifying the branch instruction in response to completion of the second execution.

The apparatus according to the present technique can reduce the performance issues associated with speculation barrier instructions while still providing the security improvements provided by said instructions. This is provided by allowing the processing of a subsequent instruction to be completed even while a speculation barrier is present, but inhibiting or deferring the updating of any branch prediction structures. The instruction is left in the issue queue—that is, it is not invalidated or erased from the queue—even after this first execution, so that it can be re-executed once the speculation barrier instruction has been completed in order to allow the branch prediction structures to be updated. This allows both the performance benefits of branch prediction structures and the security benefits of speculation barrier instructions to be provided.

The two-stage execution described above applies to instructions which follow a speculation barrier in program order, and this typically indicated by the order of instructions in a commit queue or commit structure. In this case, if an instruction follows a speculation barrier instruction in the commit queue, this identifies that the instruction follows the speculation barrier instruction in program order and that the instruction should not be allowed to fully execute (in other words only a first execution, in which branch prediction structures are not updated, should be performed). Instead of the instruction being erased from the commit queue or the issue queue at this point, the instruction remains in both. Once the speculation barrier instruction has completed—this means that the speculation barrier instruction has been resolved, and is no longer present in the commit queue—any instructions which were executed according to a first execution can now be re-executed according to a second execution. In the second execution, as described above, the branch prediction structures are updated before the instruction is removed or invalidated in the issue queue. Any instructions prior to the speculation barrier instruction in the commit queue can be executed as normal.

The issue queue holds a number of entries, each identifying an instruction that is pending execution. Instructions in the issue queue can be selected by selection circuitry to be executed by execution circuitry. The issue queue is not necessarily arranged in program order. The commit queue, on the other hand, is arranged in program order and is configured to identify the program order of instructions, which can prove useful in situations where a branch misprediction occurs. The commit queue may be a part of the commit circuitry discussed above, which may also include control circuitry for controlling the allocation of entries to the commit queue and the removal or resolving of entries in the commit queue. The execution circuitry executes instructions in an execution order, which need not necessarily be the program order, particularly when branch instructions are encountered. Instructions may be fetched according to branch predictions made by the branch predictor, and this may mean executing outside of program order. The branch predictor makes predictions based on branch prediction data items, which may be provided by the execution circuitry following the execution of a branch instruction. It is these branch prediction data items in particular which are inhibited from being updated during the first execution of an instruction which follows a speculation barrier instruction.

As is clear from the above description, the apparatus can be implemented in many conventional processing systems, since commit circuitry, issue circuitry and execution circuitry, as well as other components described above, are already readily available in many processing systems. As a result, this is an easily applicable technique for improving the performance of processing of instructions in the presence of a speculation barrier instruction.

In some examples of the present technique, when the commit circuitry determines that the oldest instruction for which a commit queue entry is currently stored has been resolved, the commit circuitry is configured to invalidate the commit queue entry identifying that oldest instruction, in which the commit circuitry is configured to determine that an issue queue entry is resolved when any opportunity for the instruction to cause an exception has passed.

As noted above, the commit queue in the commit circuitry holds a number of instructions in its entries in a program order, this therefore makes the commit structure a useful mechanism for identifying whether an instruction follows a speculation barrier in program order. The commit circuitry identifies whether the oldest instruction in the commit queue has been resolved. An instruction is considered to have been resolved once it can no longer cause an exception to be generated, where an exception is considered to be a change of the instruction flow or predicted instruction flow as fetched by the processing circuitry. In many cases, this may mean that an instruction is considered to have been resolved once it has been executed. However, in other examples an instruction is considered to have been resolved once it has been issued—for example, an add instruction cannot cause an exception once it has been issued, and thus is considered to have been resolved when it is issued. Whenever the commit circuitry determines that the oldest instruction in the commit queue has been resolved, the commit circuitry invalidates the corresponding entry. In this way, the commit circuitry can identify whether a pending instruction comes before or after a speculation barrier instruction in the program order. The commit circuitry is therefore an efficient example of a method of regulating the order of instructions.

In some examples, the processing circuitry is configured to execute the speculation barrier instruction by retaining an issue queue entry identifying the speculation barrier instruction in the issue queue until all earlier instructions in the program order have been executed, and then to complete execution of the speculation barrier instruction and to invalidate the issue queue entry identifying the speculation barrier instruction.

In this way, the processing circuitry is able to easily identify whether a speculation barrier instruction is present, where that speculation barrier instruction has not yet been resolved. It should be noted, however, that the speculation barrier instruction need not necessarily be allocated to the issue queue as described above. In some examples it may simply remain in the commit queue. In any case, in examples where the speculation barrier is allocated to the issue queue, it remains in the issue until all earlier instructions in the program order have been executed. This allows the processing circuitry to easily identify whether the speculation barrier is still pending. Once a speculation barrier has been resolved, or de-allocated from the commit queue, the speculation barrier instruction can also be de-allocated from the issue queue. De-allocation of entries from the issue queue or the commit queue typically involves invalidating said entry.

In some examples, the issue circuitry is configured to invalidate the issue queue entry identifying the speculation barrier instruction in response to the commit queue entry identifying the speculation barrier instruction being invalidated.

Invalidating the issue queue entry identifying the speculation barrier instruction once the instruction has been resolved in the commit queue provides a simple and efficient technique for identifying whether the speculation barrier instruction is still pending. It should be noted that it is possible for the entry in the issue queue or the commit queue identifying the speculation barrier instruction to instead be erased completely rather than simply being invalidated.

In some examples, in response to the commit queue entry for the speculation barrier instruction being invalidated, the commit circuitry is configured to transmit a speculation-barrier-completed signal to the issue circuitry indicating that execution of the speculation barrier instruction has been completed; and in response to receipt of the speculation-barrier-completed signal, the issue circuitry is configured to invalidate the issue queue entry identifying the speculation barrier instruction.

The commit circuitry can control the execution of pending instructions that follow the speculation barrier in program order by issuing control signals to the processing circuitry. For example, a speculation-barrier-completed signal may be transmitted by the commit circuitry to the issue circuitry in order to indicate that execution of the speculation barrier instruction has completed. This signal may be transmitted once the speculation barrier instruction has been invalidated from the commit queue. In response to receiving this speculation-barrier-completed signal, if the speculation barrier instruction is present in the issue queue, the execution circuitry invalidates the issue queue identifying the speculation barrier instruction. In this way, the commit circuitry can be utilised to identify when an instruction follows a speculation barrier instruction in program order.

In some examples, the branch predictor is configured to predict the outcome of the branch instructions dependent upon the outcome of previously executed branch instructions.

As discussed above, branch predictors are useful for predicting the outcome of branches in execution code, by predicting whether or not a branch will be taken, and predicting the target of that branch. Sometimes, branch predictors form these predictions on the basis of the outcome of previous branch instructions.

In some examples, the processing circuitry comprises a decoder to decode instructions to be provided to the issue circuitry for respective issue queue entries to be stored in the issue queue.

It is common to provide a decoder to decode instructions fetched by the processing circuitry, in order to allocate the instructions to the issue queue for future issuing to the execution circuitry.

In some examples, until the commit queue entry identifying the speculation barrier instruction has been invalidated, the decoder is configured to provide a barrier indication to the issue circuitry that a decoded instruction follows the speculation barrier instruction in the program order; and in response to receiving the barrier indication, the issue circuitry is configured to associate with an issue queue entry identifying the decoded instruction, a barrier flag indicating that the decoded instruction follows a speculation barrier instruction in the program order.

The decoder present in the processing circuitry can be configured to provide the instructions to the issue circuitry in such a way that these instructions can be clearly identified as following or indeed not following a speculation barrier instruction. The decoder can do this by, for example, providing a barrier indication to the issue circuitry upon decoding an instruction in order to indicate that that instruction follows the speculation barrier instruction in the program order. Then, in response to receiving the barrier indication, the issue circuitry can associate a barrier flag with the corresponding entry in the issue queue for that instruction. The barrier flag can indicate to the processing circuitry, or to the execution circuitry, that this instruction follows the speculation barrier instruction in program order and thus should only be executed according to the first execution while the speculation barrier is still pending. This is a particularly effective and efficient manner of implementing the present technique.

In some examples, the decoder is configured to provide the barrier indication to the issue circuitry in response to a speculation-barrier signal from the commit circuitry indicating that the instruction follows the speculation barrier instruction in the program order.

Thus, the speculation-barrier signal provided by the commit circuitry, as described above, allows the commit circuitry to be used to control the execution of instructions in the issue queue.

In some examples, in response to the issue circuitry determining that the one or more branch prediction data items in the branch predictor associated with the branch instruction would not be updated in response to execution of the branch instruction according to the branch prediction, the processing circuitry is configured to invalidate the issue queue entry identifying the branch instruction in response to completion of the first execution of the branch instruction.

While the technique as previously described may provide significant performance improvements over typical systems employing speculation barrier instructions, further improvements can be made by treating differently any instructions which would not cause an update to the branch prediction instructors. These instructions need not be left in the issue queue following the first execution, because if they were left in the queue to be executed a second time after the speculation barrier instruction has been resolved, no updates would be provided to the branch predication structure during this second execution. Thus, leaving the such instructions in the issue queue unnecessarily wastes space in the issue queue and wastes processing power in performing the unnecessary second execution of the instruction. Therefore, in some examples, when the issue circuitry determines that following execution of a branch instruction the one or more branch prediction data items would not be updated, the processing circuitry does invalidate this instruction after its first execution, even if the instruction follows a speculation barrier instruction in program order. This is potentially particularly efficient, because it allows issue queue entries to be freed up so that further instructions can be issued to the issue queue. This reduces the likelihood of a stall occurring during execution.

In some examples, when the issue circuitry determines that the one or more branch prediction data items associated with a decoded branch instruction would not be updated in response to execution of the branch instruction according to the branch prediction, the decoder is configured to provide an invalidation indication to the issue circuitry; and in response to receiving the invalidation indication, the issue circuitry is configured to associate with an entry in the issue queue corresponding to the decoded instruction, an invalidation flag indicating that the issue queue entry identifying the decoded instruction can be invalidated after first execution.

In the examples described above, where instructions would not cause an update to branch predictors, it is useful to provide some kind of indication to the processing circuitry that after the first execution of such instructions they should be de-allocated from the issue queue. For example, this can be achieved by, in response to the issue circuitry determining that the one or more branch prediction data items would not be updated following execution of a particular decoded branch instruction, providing an invalidation indication to the issue circuitry. This invalidation indication is provided by the decoder and in response to the invalidation indication the issue circuitry associates an invalidation flag with that associated entry indicating to the issue circuitry that the instruction can be invalidated after the first execution.

In some examples, the apparatus comprises: a fetch unit to fetch instructions for execution; and an instruction cache to store instructions to be fetched by the fetch unit; in which, following an incorrect branch prediction, the execution circuitry is configured to trigger the fetch unit to perform a lookup in the instruction cache for an entry storing a correct branch target instruction and, when a corresponding entry is found, to fetch the correct branch target instruction independently of the presence of the speculation barrier instruction.

As noted above, the present techniques are particularly applicable to processing circuitry having a branch prediction structure. In such applications, a fetch unit is provided which fetches instructions for execution, typically following predictions by a branch predictor. The order in which the instructions are fetched by the fetch unit defines the instruction flow. When a branch is incorrectly predicted, the execution circuitry triggers the fetch unit to perform a look up in an instruction cache for an entry that corresponds to the correct branch target instruction, the branch target instruction being the result instruction of a branch taken. The fetch circuitry will fetch the correct branch target instruction independently of the presence of the speculation barrier instruction. The instruction will be put into the issue queue, however it will then be processed according to the technique set out above.

In some examples a method comprises: storing, in a commit queue, a plurality of commit queue entries identifying respective instructions in a program order; selecting pending instructions from an issue queue to issue to execution circuitry for execution in an execution order, the issue queue comprising a plurality of issue queue entries, each issue queue entry identifying a pending instruction awaiting execution by the execution circuitry; executing processing operations in response to program instructions; predicting the outcome of branch instructions according to one or more branch prediction data items; while one of the plurality of commit queue entries identifies a speculation barrier instruction, in response to selecting for issue a branch instruction that follows the speculation barrier instruction in the program order, performing a first execution of the branch instruction, the first execution inhibiting updating of one or more branch prediction data items associated with the branch instruction and inhibiting selection circuitry from invalidating the issue queue entry identifying the branch instruction; and in response to completion of execution of the speculation barrier instruction, performing a second execution of the branch instruction to update the one or more branch prediction data items associated with the branch instruction, and invalidating the issue queue entry identifying the branch instruction in response to completion of the second execution.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. The branch predictor 4 may, for example, predict the outcome of branch instructions dependent on the outcome of previous instructions, such as when the outcome of a previous instruction gives an indication of the next instruction to be fetched. This is therefore an example of the branch predictor being configured to predict the outcome of the branch instructions dependent upon the outcome of previously executed branch instructions. Should the branch predictor make an incorrect prediction of the series of addresses to be fetched, the execute stage 18 triggers the fetch unit 6 to fetch the correct branch target instruction from the instruction cache 8 or other memory structures 32, 34. This is an example of, following an incorrect branch prediction, the execution circuitry 18 being configured to trigger the fetch unit 6 to perform a lookup in the instruction cache 8 for an entry storing a correct branch target instruction and, when a corresponding entry is found, to fetch the correct branch target instruction independently of the presence of the speculation barrier instruction.

A fetch stage 6 fetches the instructions identified by the fetch addresses from an instruction cache 8. This is an example of a fetch unit to fetch instructions for execution and an instruction cache to store instructions to be fetched by the fetch unit. A decode stage 10 decodes the fetched instructions to generate control information for controlling the subsequent stages of the pipeline. The decode stage 10 is an example of a decoder to decode instructions to be provided to the issue circuitry 16 for respective issue queue entries to be stored in the issue queue. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be avoided by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 includes an issued queue which queues instructions awaiting execution until the required operands for processing those instructions are available in the registers 14, and selection circuitry to select instructions for execution by the execute stage 18. The execute stage 18 executes the instructions to carry out corresponding processing operations. A writeback stage 20 writes results of the executed instructions back to the registers 14.

The data processing apparatus 2 is an example of processing circuitry comprising execution circuitry 18 to execute processing operations in response to program instructions having a program order, commit circuitry comprising a commit queue 100, issue circuitry 16, and a branch predictor 4 to predict the outcome of branch instructions according to one or more branch prediction data items.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. Access to memory may be controlled using a memory management unit (MMU) 35 for controlling address translation and/or memory protection. The load/store unit 26 may use a translation lookaside buffer 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Also included in the processing system 2 is commit circuitry, comprising a commit queue 100 and control circuitry 102. In the commit queue are a plurality of entries, each identifying an instruction; the instructions identified by entries in the commit queue 100 being held in a program order—that is, the order in which they are specified in the program code. The control circuitry 102 is configured to receive instructions from the instruction cache 8 in the program order and place them into the commit queue 102. Whenever the oldest instruction in the commit queue 100 is determined, by the control circuitry 102, to have been resolved—that is, when it is determined that the instruction can no longer trigger an exception—the commit circuitry 102 is configured to invalidate the corresponding instruction in the commit queue.

The branch predictor 4 may include structures for predicting various outcomes of branch instructions. For example the branch predictor 4 may include a branch direction predictor which predicts whether conditional branches should be taken or not taken. Another aspect of branch outcomes that can be predicted may be the target address of a branch. For example, some branch instructions calculate the target address indirectly based on values stored in the registers 14 and so can branch to addresses which are not deterministically known from the program code itself.

Recently, issues affecting the security of data processing apparatuses having branch predictions structures, particularly in cases where multiple different processes execute in the same pipeline, have been identified. When different processes execute on the same pipeline, typically the branch predictor 4 has been shared between those processes. As different processes may have different branch behaviour at the same instruction address, this can mean that looking up the branch predictor structures for a given instruction address could provide predicted behaviour which may not be relevant to one process because it has been trained based on another process. Typically, branch mispredictions resulting from one process accessing a branch prediction entry that was trained by another process would have been regarded as merely an issue affecting performance rather than affecting security, since if the prediction is incorrect then this will be detected when the branch is actually executed in the branch unit 21 and then the branch unit can trigger the pipeline to be flushed of subsequent instructions fetched incorrectly based on the misprediction, and the processor state can be rewound to the last correct state resulting from the last correctly predicted instruction.

However, while the architectural effects of a misprediction may be reversed, the misprediction may cause longer lasting effects on micro-architectural state such as the data cache 30 or TLB 36. It has recently been recognised that it is possible for an attacker to exploit the branch predictor 4 to gain access to secret information that the attacker should not have access to. The memory management unit 35 may apply a privilege scheme so that only processes executed at certain privilege levels are allowed to access certain regions of memory.

One way to provide protection against such attacks is through the use of speculation barrier (SB) instructions, which, amongst other functions, prevent branch prediction structures from being updated when an instruction is executed that follows the speculation barrier instruction in program order. When one of the instructions retrieved by the control circuitry 102 from the instruction cache 8 is a speculation barrier instruction, this instruction may reside in the commit queue 100 without being fetched by the fetch unit 6 for storage within the issue stage 16. In other examples, however, the speculation barrier instruction may be fetched and decoded by the fetch unit 6 and decoder 10 as normal, and placed in the issue queue of the issue stage 16.

While the speculation barrier instruction is present in the commit queue 100, the control circuitry 102 is arranged to transmit a speculation-barrier signal to the decoder 10 to indicate that a speculation barrier instruction is present in the commit queue 100. In response to the speculation-barrier signal, the decoder 10 is arranged to provide a barrier indication to the issue stage 16 when a decoded instruction follows the speculation barrier instruction in processing order. The barrier indication triggers the issue stage 16 to associate, with the issue queue entry associated with the decoded instruction, a barrier flag indicating that the instruction follows the speculation barrier instruction in program order.

The control circuitry 102 is also in communication with the issue stage 16, so that it can provide an indication to the issue stage 16 when an instruction should be re-issued following the completion if a speculation barrier instruction. Also, the control circuitry is configured to receive signals from the execute stage 18 and the issue stage 16 which enable it to determine when an entry should be de-allocated (e.g. invalidated) from the commit queue 100.

Figure 2:
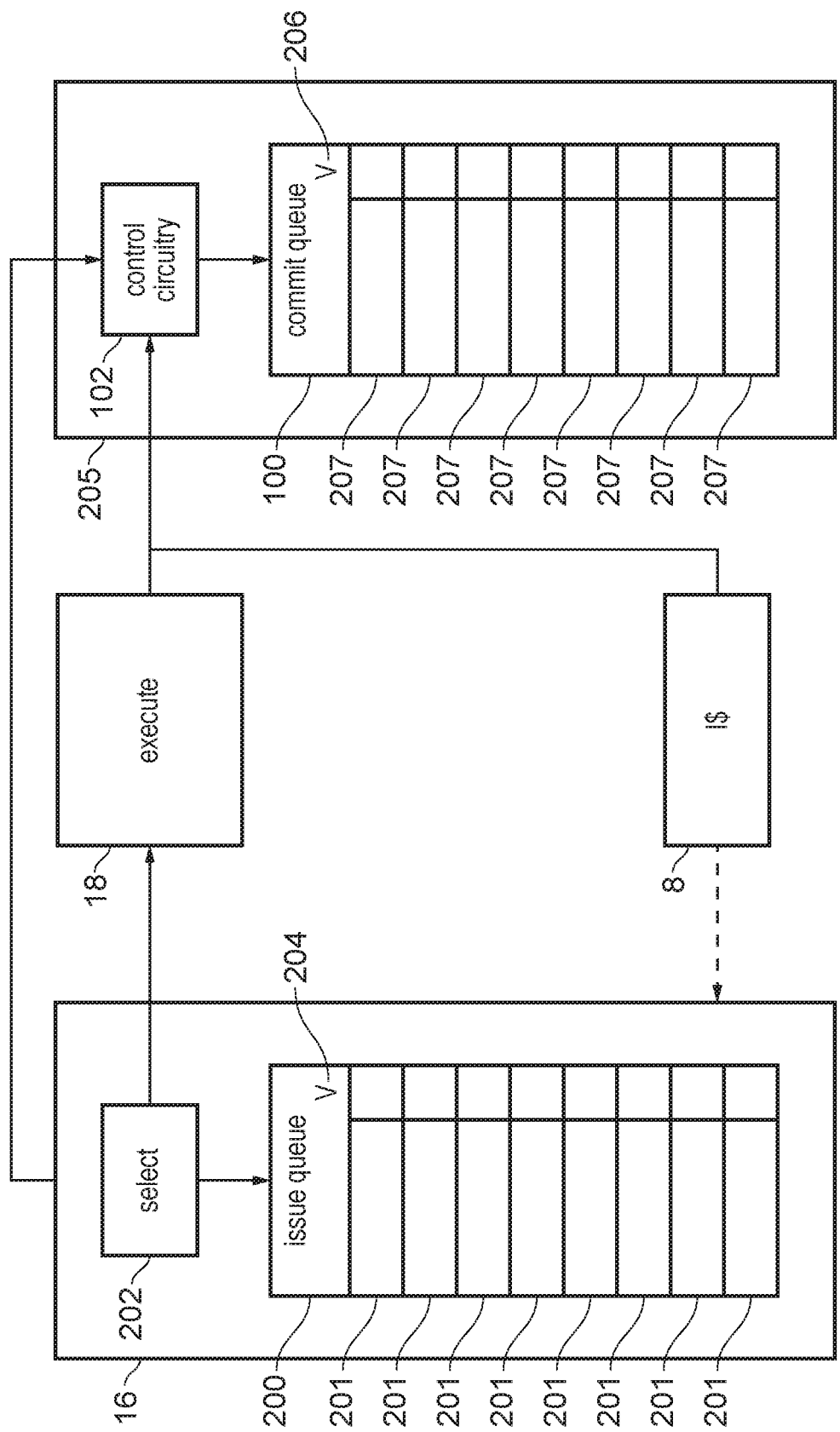
FIG. 2 shows a schematic representation of a section of the data processing system depicted in FIG. 1.

FIG. 2 shows an example of some of the hardware within the data processing system 2. In particular, the figure shows an instruction cache 8 in communication with the issue circuitry (issue stage) 16. This communication is shown with a dotted arrow, because it is not intended to represent a direct communication—as shown in FIG. 1 the instruction cache 8 communicates with the issue stage 16 via a number of additional stages. The issue stage 16 is shown as including an issue queue 200 and selection circuitry 202. The issue queue 200 has a number of entries 201, each storing an indication of an instruction that is pending execution by the execution circuitry 18. Associated with each entry of the issue queue is a valid bit 204 which indicates whether that entry is a valid entry. An entry that is indicated as invalid is no longer considered to be present within the issue queue 200, and can be overwritten by a subsequently fetched instruction. The selection circuitry 202 selects instructions from the issue queue 200 for issue to the execution circuitry 18. The execution circuitry 18 is configured to perform either a full execution of the instruction, in which the instruction is executed and any branch prediction structures are updated, or a partial execution. For example, if an instruction selected by the selection circuitry 200 follows a speculation barrier instruction in the program order, the execution circuitry 18 is configured to perform a first execution of that instruction, in which the execution circuitry 18 does not update any branch prediction structures.

The issue stage 16 is an example of issue circuitry comprising an issue queue 200 and selection circuitry 202, in which the issue queue 200 comprises a plurality of issue queue entries 201, each issue queue entry identifying a pending instruction awaiting execution by the execution circuitry 18, and the selection circuitry 202 is configured to select pending instructions from the issue queue 200 to issue to the execution circuitry for execution in an execution order. The commit circuitry 205 is an example of commit circuitry comprising a commit queue 100 to store a plurality of commit queue entries 207 identifying respective instructions in the program order.

FIG. 2 also shows commit circuitry 205 comprising a commit queue 100 and control circuitry 102. The commit queue 100, like the issue queue 200, comprises a plurality of entries 207, each having an associated valid bit 206, in which the valid bit 206 indicates whether that entry 207 is valid. The entries 207 of the commit queue 100 represent instructions in a program order, thus enabling the processing circuitry to determine whether an instruction follows a speculation barrier instruction in the program order. The control circuitry 102 receives instructions from the instruction cache 8 and provides these to the commit queue 100 to be stored in one of its entries 207. As discussed above when the oldest entry in the commit queue is resolved (when it can no longer cause an exception) the control circuitry is configured to invalidate that entry. Invalidation of an entry involves replacing the valid bit 200 with a value indicating that the entry is no longer valid. The control circuitry 102 therefore receives input from the execution circuitry 18 and the issue stage 16 which enable it to determine when an instruction has been resolved. While a speculation barrier instruction is present in one of the entries 207 of the commit queue 100, and the valid bit 200 for the SB entry is set, the execution circuitry 18 is configured to only perform the first execution of any instruction fetched from the issue queue 200 that follows the speculation barrier in the program order, as determined by the commit queue 100. When the speculation barrier is completed—when it is invalidated in the commit queue due to being resolved—the execution circuitry is configured to perform the second execution of any of the instructions for which a first execution has previously been performed; the second execution involving updating any branch prediction structures affected by execution of those instructions. The signals sent by the control circuitry to various other parts of the processing circuitry that trigger this to happen are described above and will also be described again in more detail below with respect to the later figures.

It will be appreciated that, although the issue circuitry 16 and the commit circuitry 205 are shown in FIGS. 1 and 2 as integrated components, it is also possible for the selection circuitry 202 and the issue queue 200, or the control circuitry 102 and commit queue 100, to be formed of separate components.

Figure 3:
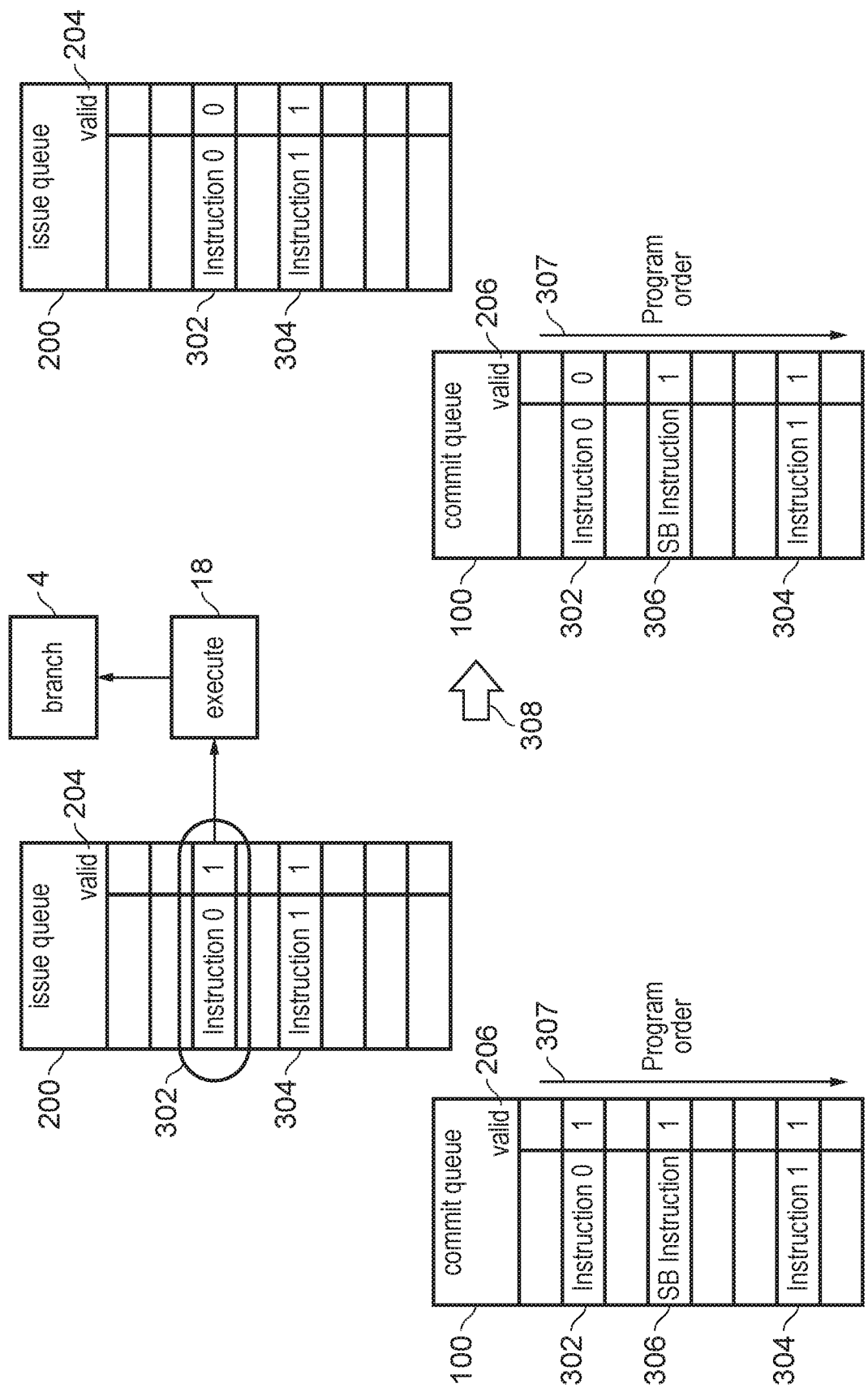
FIGS. 3, 4, 5A and 5B show examples of the processing of branch instructions in the presence of a speculation barrier instruction.

FIG. 3 shows schematically how an instruction can be executed when that instruction comes before a speculation barrier in the commit queue 100. It should be noted that when there is no speculation barrier present, all instructions are processed this way.

As shown in FIG. 3, the commit queue 100 as drawn is populated by at least a first instruction and a second instruction, labelled "instruction 0" 302 and "instruction 1" 304, and a speculation barrier instruction 306. Although only these three instructions are shown in the commit queue 100, it should be noted that the other entries in the commit queue will typically also comprise other instructions. Each of the three instructions 302, 306, 304 recorded in the commit queue are valid—the valid bit 206 is set to 1 for all three entries. Since all three entries are pending, the first and second instructions 302, 304 are both still shown as valid in the issue queue 200. Again, it should be noted that although only two instructions are shown in the issue queue 200, other instructions would typically also be present. In FIG. 3 the speculation barrier instruction 306 is not shown within the issue queue 200. However, in alternative examples—as mentioned above—the speculation barrier instruction 306 may also be present in the issue queue.

When the selection circuitry 202 (not shown in this figure) selects the first instruction 302 for execution, that instruction is sent to the execute stage 18 to be executed. Because the first instruction 302 comes before the speculation barrier instruction 306 in the program order as indicated by the commit queue 100 (the program order is shown by a schematic arrow 307), the execution stage 18 also instructs or allows any branch prediction structures 4 to be updated on the basis of the execution of the first instruction 302. This is an example of the processing circuitry 2 being configured to identify a speculation barrier (SB) instruction 306 in the commit queue 100. After the instruction 302 has been executed—shown after the schematic arrow 308—the instruction 302 is invalidated in both the commit queue 100 and the issue queue 200. This involves setting the valid bit 206 in the commit queue and the valid bit 204 in the issue queue to 0 for the instruction 302 in both. In due course, the first instruction 302 will be overwritten by another instruction. Processing then continues with the selection circuitry 202 selecting another instruction from the issue queue 200 and executing it.

Figure 4:
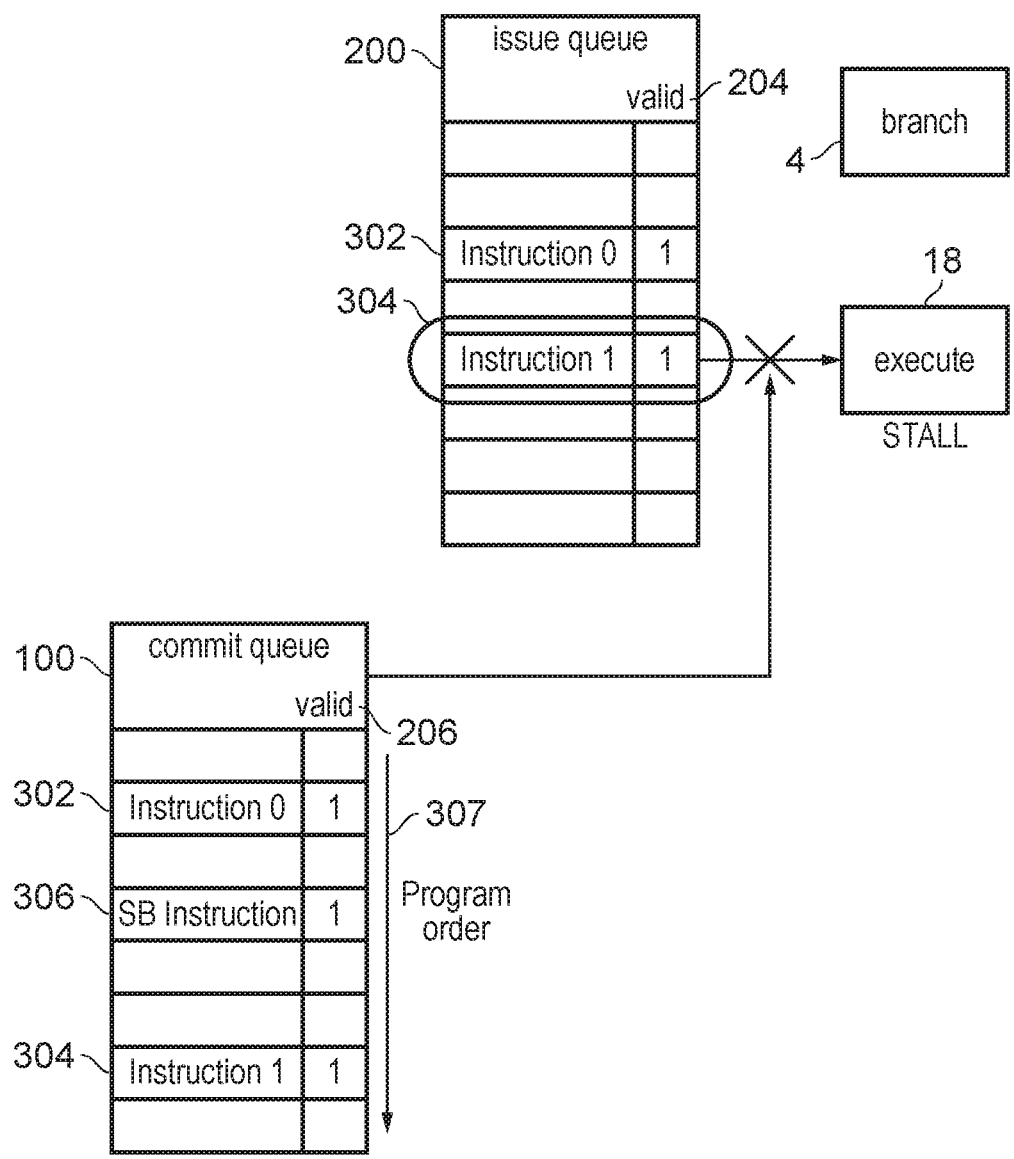

FIG. 4 shows an example of a previously proposed technique of execution of the second instruction 304, which follows the speculation barrier 306 in the program order. This figure shows the prior art approach to such situations. In this example, the second instruction 304 is selected by the selection circuitry 202 for execution by the execute stage 18. However, because the instruction 304 follows a speculation barrier instruction 306 in the program order, as indicated by the commit queue 100, the execute stage 18 is not permitted to execute the instruction 304, and therefore the processing pipeline stalls. This prevents any caching structures related to the instruction 304 from being updated, improving the security of the system. However, the stall in the pipeline significantly affects the performance of the processing system.

Figure 5A:
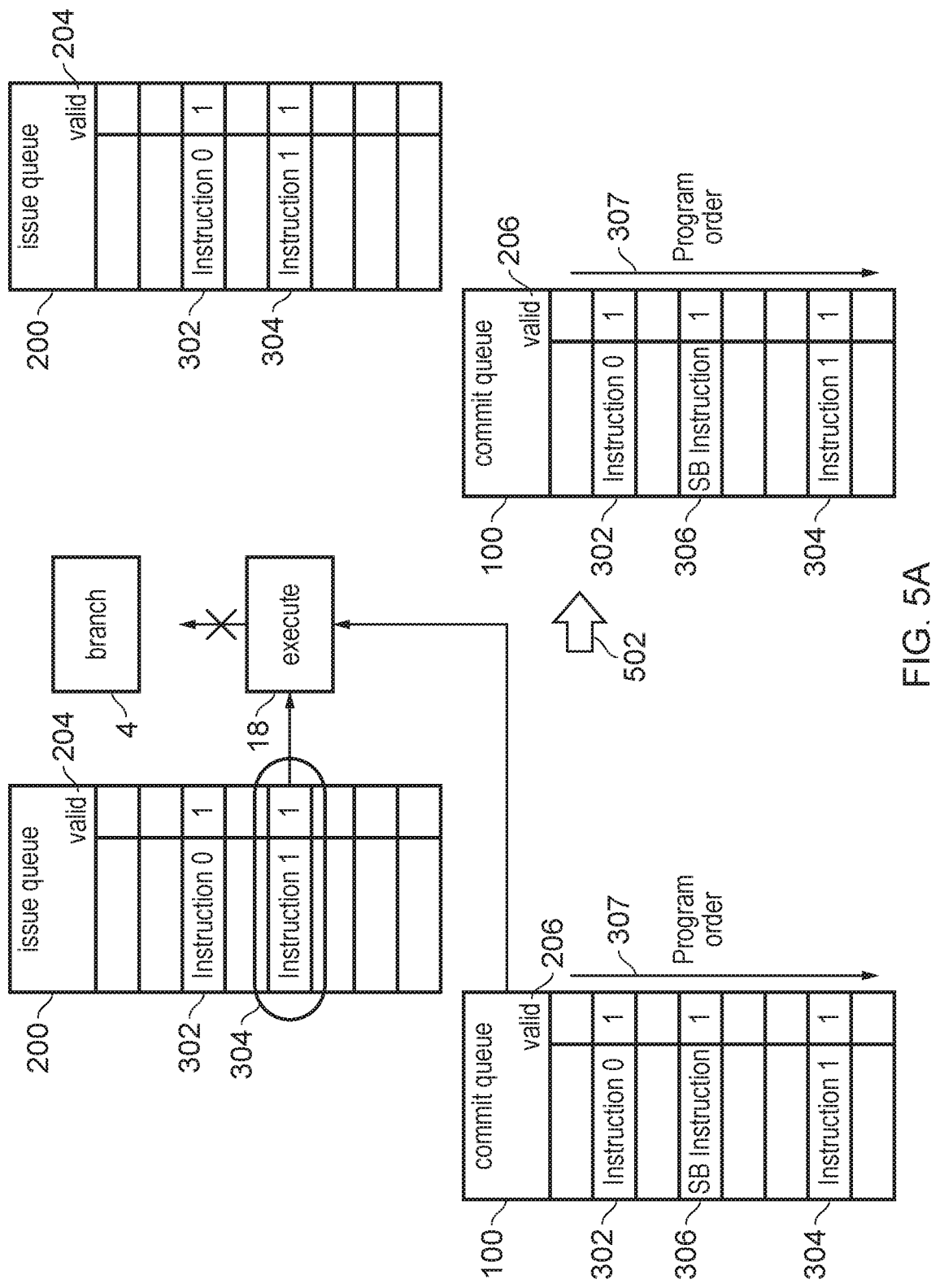
Figure 5B:
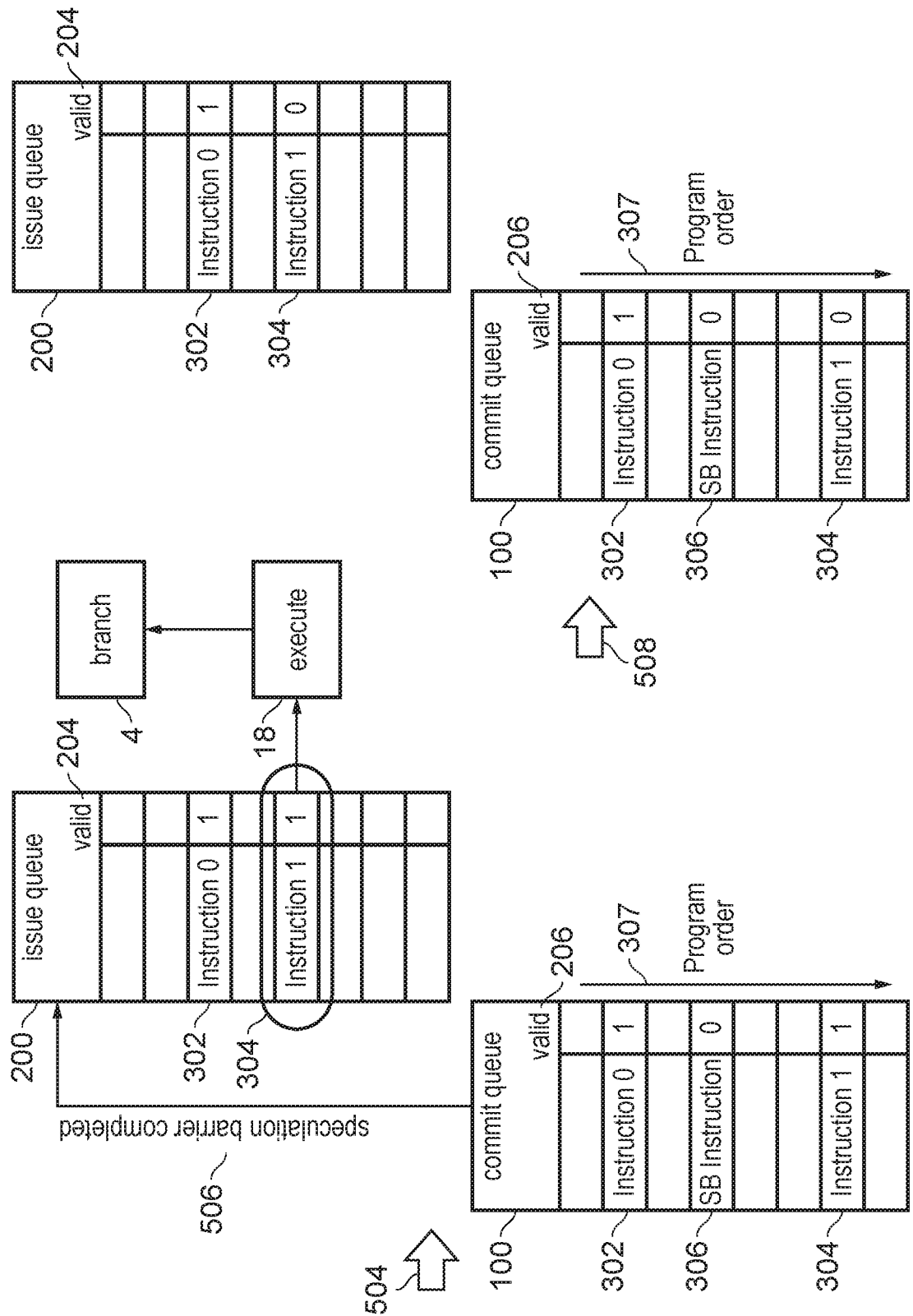

FIGS. 5A and 5B, on the other hand, show a potentially more efficient approach to executing the second instruction 304. In this example, when the selection circuitry 202 (not shown in this figure) selects for execution the second instruction 304, the execute stage 18 is still permitted to execute this instruction. However, the branch prediction structures 4 are not updated in response to this execution of the instruction 304; it is therefore a partial execution at this stage. This reduces the likelihood of the pipeline stalling, allowing processing to continue. Following this first execution of the instruction 304 (shown after the schematic arrow 502) the instruction 302 is not de-allocated from the issue queue 200. In other words, the valid bit 204 for the instruction 302 is left as 1. This allows the instruction to be re-executed once the speculation barrier 306 has completed. Likewise, the instruction 304 in the commit queue 100 also remains valid. This is an example of, while one of the plurality of commit queue entries identifies a speculation barrier instruction 306, in response to the selection circuitry 202 selecting for issue a branch instruction 304 that follows the speculation barrier instruction 306 in the program order, the processing circuitry 2 being configured to perform a first execution of the branch instruction 304, in which the first execution comprises the processing circuitry inhibiting updating of one or more branch prediction data items associated with the branch instruction and inhibiting the selection circuitry 202 from invalidating the issue queue entry 304 identifying the branch instruction.

Continuing to FIG. 5B, after the speculation barrier instruction 306 has completed and the valid bit 206 for the speculation barrier 306 has been set to 0 (after the schematic arrow 504) a "speculation barrier completed" signal 506 is transmitted from the commit circuitry 205 to the issue circuitry 16 comprising the issue queue 200. The speculation barrier instruction 306 completes when it is the oldest instruction in the commit queue 100, and the control circuitry 102 has determined that it can no longer cause an exception; at this point it is said to have been "resolved" and the corresponding entry is invalidated by setting the valid field 206 to 0. This is an example of the commit circuitry 205 determining that the oldest instruction for which a commit queue entry is currently stored has been resolved, and in response being configured to invalidate the commit queue entry identifying that oldest instruction, in which the commit circuitry is configured to determine that an issue queue entry is resolved when any opportunity for the instruction to cause an exception has passed. The "speculation barrier completed" signal 506 indicates that the instruction 304 should be re-executed—that is the second execution should be performed by the execution circuitry 18. In this second execution, the branch prediction structures 4 are updated, and following this second execution (after schematic arrow 508) the instruction 304 can be de-allocated from the issue queue 200, meaning the valid bit 204 for the entry associated with this instruction 304 is set to 0. Similarly the valid bit 206 in the commit queue 100 associated with this instruction 304 is also set to 0. This is an example of, in response to completion of execution of the speculation barrier instruction 306, the processing circuitry 2 being configured to perform a second execution of the branch instruction 304 to update the one or more branch prediction data items associated with the branch instruction, the selection circuitry 202 being configured to invalidate the issue queue entry 304 identifying the branch instruction in response to completion of the second execution. This is also an example of, in response to the commit queue entry for the speculation barrier instruction 306 being invalidated, the commit circuitry 205 being configured to transmit a speculation-barrier-completed signal 506 to the issue circuitry 16 indicating that execution of the speculation barrier instruction has been completed. Also shown is, in response to receipt of the speculation-barrier-completed signal 506, the issue circuitry 16 being configured to invalidate the issue queue entry identifying the speculation barrier instruction.

Figure 6:
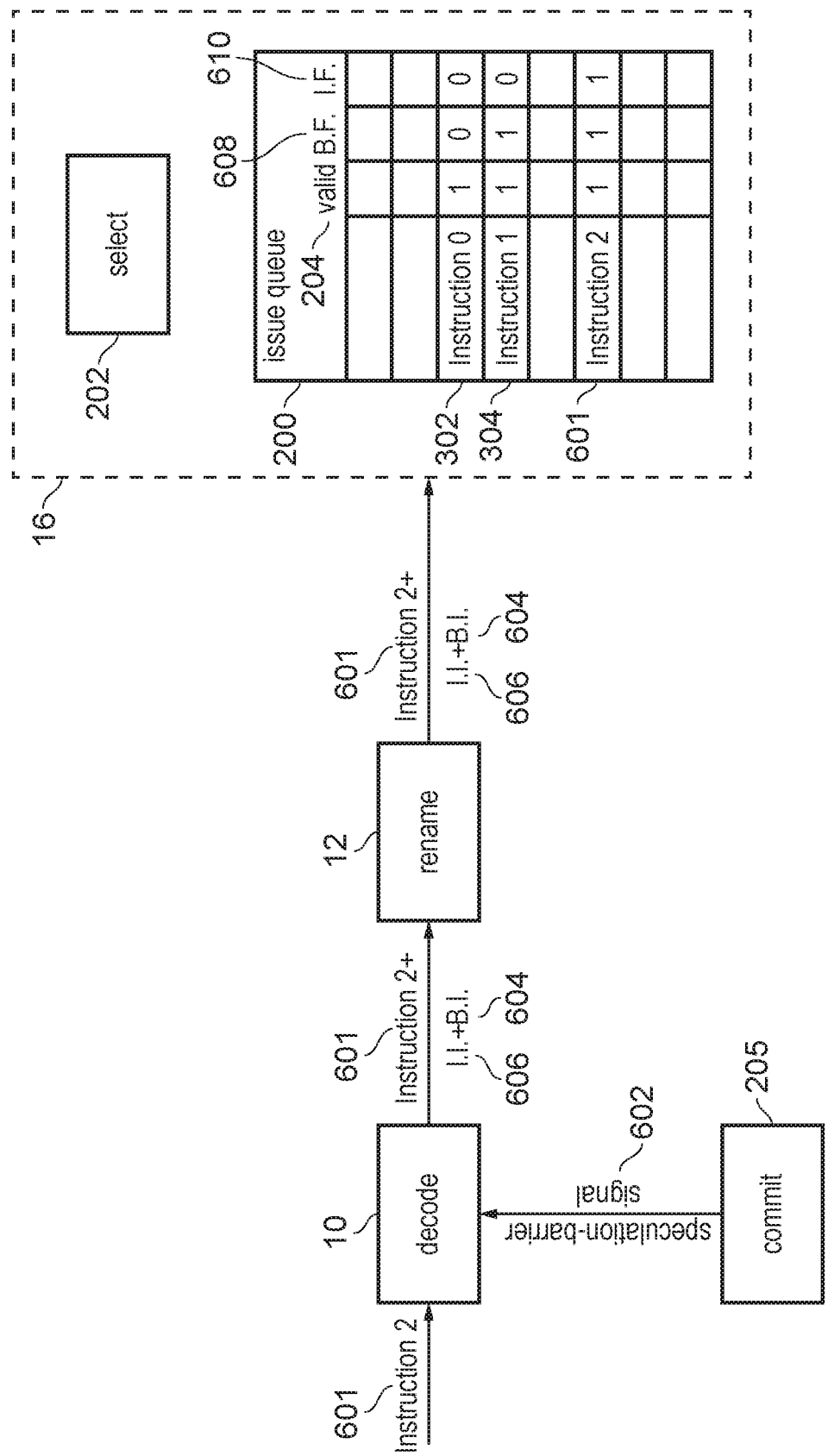
FIG. 6 shows an example of the allocation of an instruction to the issue queue.

FIG. 6 is a schematic diagram showing some of the components of the processing system 2, showing some of the signals sent between these components. In particular, FIG. 6 shows the allocation of an entry to the issue queue 200 for a third instruction 601, in which it is assumed that the third instruction 601 follows the speculation barrier instruction 306 in the program order, but would not cause any updates to branch prediction structures 4 upon a full execution or a second execution.

In allocating an entry to the issue queue 200, the instruction 601 is first received by the decode circuitry 10. Although not shown in this diagram, the decode circuitry 10 typically receives this instruction 601 from the fetch unit 6. The decode circuitry 10 also receives a speculation-barrier signal 602, which indicates that the instruction 601 follows the speculation barrier instruction 306 in the program order in the commit queue 100. In response to the speculation-barrier signal 602, the decode circuitry 10 is configured to provide, to the rename circuitry 12, a barrier indication 604 along with the instruction 601. This is an example of, until the commit queue entry identifying the speculation barrier instruction has been invalidated, the decoder 10 being configured to provide a barrier indication 604 to the issue circuitry 16 that a decoded instruction 601 follows the speculation barrier instruction in the program order. In this example, the decode circuitry 10 also provides to the rename circuitry 12 an invalidation indicator 606 which indicates that the instruction 601 can be invalidated after the first execution. In other words, the processing circuitry 2 has determined that the instruction 304 would not cause any updates to the branch prediction structures 4, and thus there is no need to perform a second execution of the instruction 601 once the speculation barrier instruction 306 has completed. Thus, FIG. 6 shows an example of, when the issue circuitry 16 determines that the one or more branch prediction data items associated with a decoded branch instruction would not be updated in response to execution of the branch instruction according to the branch prediction, the decoder 10 being configured to provide an invalidation indication 606 to the issue circuitry 16.

Upon receiving instruction 601, the barrier indication 604 and the invalidation indication 606, the rename circuitry 12 provides all three to the issue circuitry 16 and the instruction 601 is allocated to an entry of the issue queue 200. Within the issue queue 200 are included a valid field 204 which indicates whether or not an instruction is valid, a barrier flag field 608 which indicates whether or not an instruction follows a speculation barrier instruction in the program order, and an invalidation flag field 610 which indicates whether an instruction can be invalidated after its first execution. The barrier flag 608 is set to 1 in response to the barrier indication 604, and the invalidation flag 610 is set to 1 in response to the invalidation indicator 606. This is an example of, in response to receiving the barrier indication 604, the issue circuitry 16 being configured to associate with an issue queue entry identifying the decoded instruction, a barrier flag 608 indicating that the decoded instruction 601 follows a speculation barrier instruction in the program order. FIG. 6 shows an example of the decoder 10 being configured to provide the barrier indication 604 to the issue circuitry 16 in response to a speculation-barrier signal 602 from the commit circuitry 205 indicating that the instruction follows the speculation barrier instruction in the program order. Also shown is an example of, in response to receiving the invalidation indication 606, the issue circuitry 16 being configured to associate with an entry in the issue queue corresponding to the decoded instruction, an invalidation flag 610 indicating that the issue queue entry identifying the decoded instruction can be invalidated after first execution.

If the invalidation flag 610 is set to 1, the processing circuitry 2 may be configured to invalidate the associated entry in the issue queue 200 after a partial execution of the instruction 601, even if the barrier flag 608 is also set to 1. This is an example of, in response to the issue circuitry 16 determining that the one or more branch prediction data items in the branch predictor associated with the branch instruction 601 would not be updated in response to execution of the branch instruction according to the branch prediction, the processing circuitry 2 being configured to invalidate the issue queue entry identifying the branch instruction 601 in response to completion of the first execution of the branch instruction.

In the example of FIG. 6, for the third instruction 601, all three fields are set to 1. This is a potentially efficient method of allowing the processing circuitry to determine how the execution circuitry 18 should process an instruction.

In FIGS. 3 to 6, the SB instruction 306 is not shown in the issue queue 200. However, in some examples of the present technique, the SB instruction may also have a corresponding entry in the issue queue 200. In such examples, the SB instruction 306 may be executed by retaining its entry in the issue queue 200 until the SB instruction 306 has been resolved—that is, until all earlier instructions have been executed (or partially executed) and the SB instruction 306 has been invalidated in the commit queue. When the SB instruction is resolved, the issue queue entry is invalidated. This is an example of the processing circuitry 2 being configured to execute the speculation barrier instruction 306 by retaining an issue queue entry identifying the speculation barrier instruction 306 in the issue queue 200 until all earlier instructions in the program order have been executed, and then to complete execution of the speculation barrier instruction 306 and to invalidate the issue queue entry identifying the speculation barrier instruction 306. This is also an example of the issue circuitry 16 being configured to invalidate the issue queue entry identifying the speculation barrier instruction 306 in response to the commit queue entry identifying the speculation barrier instruction being invalidated.

Figure 7:
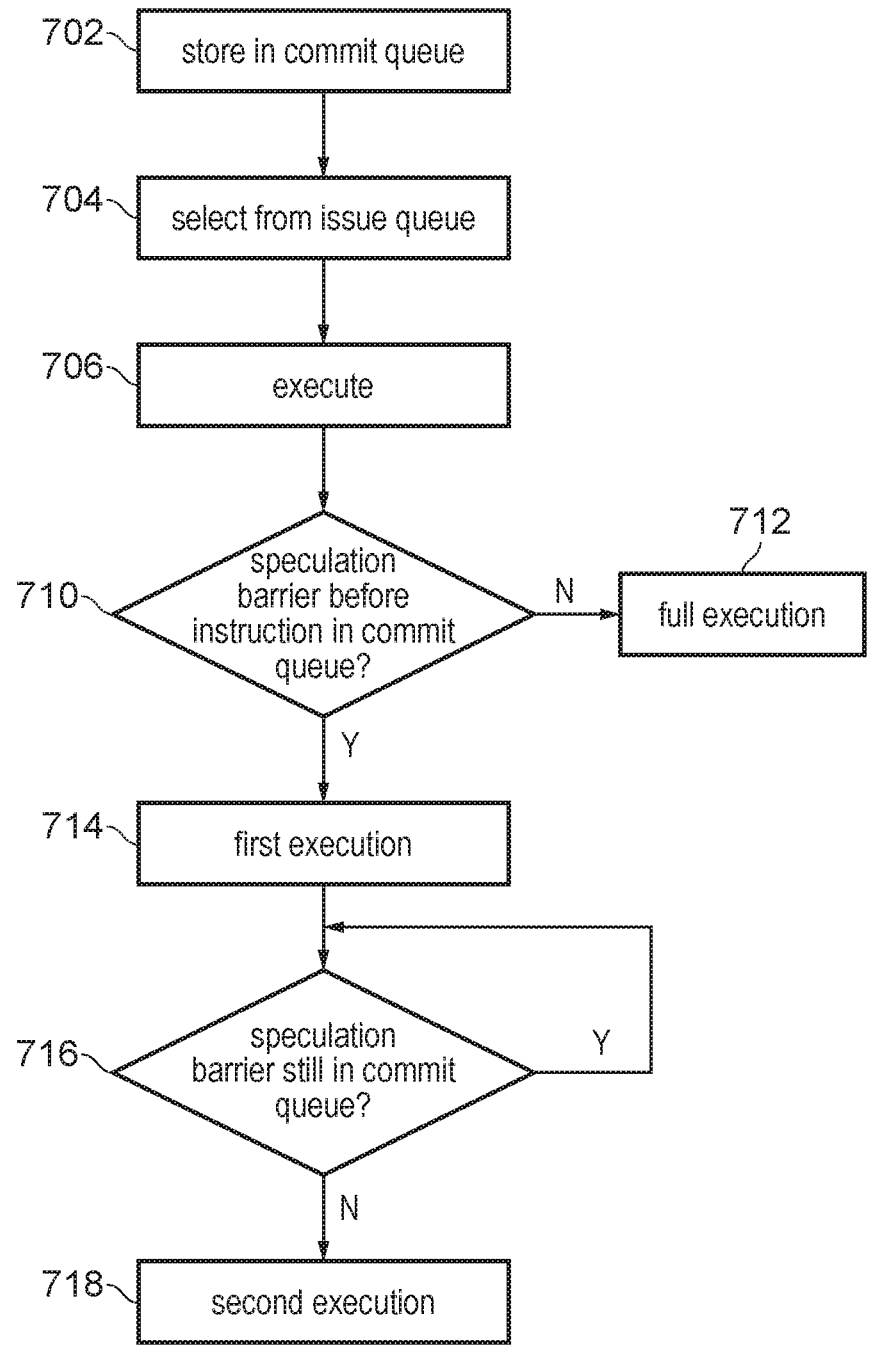
FIG. 7 is a flow diagram showing an example method of processing a branch instruction according to some examples of the present technique.

FIG. 7 is a flow diagram showing a method according to the present technique. In a step 702, a plurality of entries are stored in a commit queue 100, where each identifies a respective instruction in the program order. This is an example of storing, in a commit queue, a plurality of commit queue entries identifying respective instructions in a program order. In a step 704, pending instructions are selected from the issue queue for issuing to the execution circuitry for execution. This is an example of selecting pending instructions from an issue queue to issue to execution circuitry for execution in an execution order, the issue queue comprising a plurality of issue queue entries, each issue queue entry identifying a pending instruction awaiting execution by the execution circuitry. The instructions are executed in a step 706 in an execution order. This is an example of executing processing operations in response to program instructions. In a step 710 a determination is made as to whether or not a speculation barrier exists in the commit queue 100 before the selected instruction in the program order. If not, the method proceeds to a step 712 in which a full (normal) execution of the instruction is carried out. On the other hand, if a speculation barrier does exist before the instruction in the commit queue, the method proceeds to a step 714 in which a first execution of the instruction is carried out. In the first execution updating of the one or more branch prediction data items is inhibited. This is an example of, while one of the plurality of commit queue entries identifies a speculation barrier instruction, in response to selecting for issue a branch instruction that follows the speculation barrier instruction in the program order, performing a first execution of the branch instruction, the first execution inhibiting updating of one or more branch prediction data items associated with the branch instruction and inhibiting selection circuitry from invalidating the issue queue entry identifying the branch instruction. Following the first execution, in a step 716, a determination is made as to whether or not the speculation barrier still exists in the commit queue. If not, the second execution of the instruction is carried out, in which branch predication data items are updated. This is an example of, in response to completion of execution of the speculation barrier instruction, performing a second execution of the branch instruction to update the one or more branch prediction data items associated with the branch instruction, and invalidating the issue queue entry identifying the branch instruction in response to completion of the second execution. If a speculation barrier is still in the commit queue, the second execution is not carried out. In carrying out the second execution, the instruction is invalidated from the issue queue.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the technique have been described in detail herein with reference to the accompanying drawings, it is to be understood that the technique is not limited to those precise embodiments, and that various changes and modifications can be effected therein by one skilled in the art without departing from the scope of the technique as defined by the appended claims.

We claim:

1. An apparatus comprising:

processing circuitry comprising: execution circuitry to execute processing operations in response to program instructions having a program order, commit circuitry comprising a commit queue to store a plurality of commit queue entries identifying respective instructions in the program order and issue circuitry comprising an issue queue and selection circuitry, in which the issue queue comprises a plurality of issue queue entries, each issue queue entry identifying a pending instruction awaiting execution by the execution circuitry, and the selection circuitry is configured to select pending instructions from the issue queue to issue to the execution circuitry for execution in an execution order, the processing circuitry being configured to identify a speculation barrier instruction in the commit queue; and a branch predictor to predict an outcome of branch instructions according to one or more branch prediction data items;

in which:

while one of the plurality of commit queue entries identifies a speculation barrier instruction, in response to the selection circuitry selecting for issue a branch instruction that follows the speculation barrier instruction in the program order, the processing circuitry is configured to perform a first execution of the branch instruction, in which the first execution comprises the processing circuitry inhibiting updating of one or more branch prediction data items associated with the branch instruction and inhibiting the selection circuitry from invalidating an issue queue entry identifying the branch instruction; and in response to completion of execution of the speculation barrier instruction, the processing circuitry is configured to perform a second execution of the branch instruction to update the one or more branch prediction data items associated with the branch instruction, the selection circuitry being configured to invalidate the issue queue entry identifying the branch instruction in response to completion of the second execution.

2. The apparatus of claim 1, in which when the commit circuitry determines that an oldest instruction for which a commit queue entry is currently stored has been resolved, the commit circuitry is configured to invalidate the commit queue entry identifying that oldest instruction, in which the commit circuitry is configured to determine that an issue queue entry is resolved when any opportunity for the instruction to cause an exception has passed.

3. The apparatus of claim 2, in which the processing circuitry is configured to execute the speculation barrier instruction by retaining an issue queue entry identifying the speculation barrier instruction in the issue queue until all earlier instructions in the program order have been executed, and then to complete execution of the speculation barrier instruction and to invalidate the issue queue entry identifying the speculation barrier instruction.

4. The apparatus of claim 3, in which the issue circuitry is configured to invalidate the issue queue entry identifying the speculation barrier instruction in response to the commit queue entry identifying the speculation barrier instruction being invalidated.

5. The apparatus of claim 4, in which:
in response to the commit queue entry for the speculation barrier instruction being invalidated, the commit circuitry is configured to transmit a speculation-barrier-completed signal to the issue circuitry indicating that execution of the speculation barrier instruction has been completed; and
in response to receipt of the speculation-barrier-completed signal, the issue circuitry is configured to invalidate the issue queue entry identifying the speculation barrier instruction.

6. The apparatus of claim 1, in which the branch predictor is configured to predict the outcome of the branch instructions dependent upon the outcome of previously executed branch instructions.

7. The apparatus of claim 1, in which the processing circuitry comprises a decoder to decode instructions to be provided to the issue circuitry for respective issue queue entries to be stored in the issue queue.

8. The apparatus of claim 7, in which, until the commit queue entry identifying the speculation barrier instruction has been invalidated, the decoder is configured to provide a barrier indication to the issue circuitry that a decoded instruction follows the speculation barrier instruction in the program order; and
in response to receiving the barrier indication, the issue circuitry is configured to associate with an issue queue entry identifying the decoded instruction, a barrier flag indicating that the decoded instruction follows the speculation barrier instruction in the program order.

9. The apparatus of claim 8, in which the decoder is configured to provide the barrier indication to the issue circuitry in response to a speculation-barrier signal from the commit circuitry indicating that the decoded instruction follows the speculation barrier instruction in the program order.

10. The apparatus of claim 7, in which, in response to the issue circuitry determining that the one or more branch prediction data items in the branch predictor associated with the branch instruction would not be updated in response to execution of the branch instruction according to a branch prediction, the processing circuitry is configured to invalidate the issue queue entry identifying the branch instruction in response to completion of the first execution of the branch instruction.

11. The apparatus of claim 10, in which:
when the issue circuitry determines that the one or more branch prediction data items associated with a decoded branch instruction would not be updated in response to execution of the decoded branch instruction according to the branch prediction, the decoder is configured to provide an invalidation indication to the issue circuitry; and
in response to receiving the invalidation indication, the issue circuitry is configured to associate with an entry in the issue queue corresponding to the decoded branch instruction, an invalidation flag indicating that the issue queue entry identifying the decoded branch instruction can be invalidated after first execution.

12. The apparatus according to claim 1, comprising:
a fetch unit to fetch instructions for execution; and
an instruction cache to store instructions to be fetched by the fetch unit;
in which, following an incorrect branch prediction, the execution circuitry is configured to trigger the fetch unit to perform a lookup in the instruction cache for an entry storing a correct branch target instruction and, when a corresponding entry is found, to fetch the correct branch target instruction independently a presence of the speculation barrier instruction.

13. A method comprising:
storing, in a commit queue, a plurality of commit queue entries identifying respective instructions in a program order;
selecting pending instructions from an issue queue to issue to execution circuitry for execution in an execution order, the issue queue comprising a plurality of issue queue entries, each issue queue entry identifying a pending instruction awaiting execution by the execution circuitry;
executing processing operations in response to program instructions;
predicting an outcome of branch instructions according to one or more branch prediction data items;
while one of the plurality of commit queue entries identifies a speculation barrier instruction, in response to selecting for issue a branch instruction that follows the speculation barrier instruction in the program order, performing a first execution of the branch instruction, the first execution inhibiting updating of one or more branch prediction data items associated with the branch instruction and inhibiting selection circuitry from invalidating an issue queue entry identifying the branch instruction; and
in response to completion of execution of the speculation barrier instruction, performing a second execution of the branch instruction to update the one or more branch prediction data items associated with the branch instruction, and invalidating the issue queue entry identifying the branch instruction in response to completion of the second execution.

14. An apparatus comprising:
means for processing data, comprising: means for executing processing operations in response to program instructions having a program order, means for storing a plurality of commit queue entries identifying respective instructions in the program order, means for storing a plurality of issue queue entries, each issue queue entry identifying a pending instruction awaiting execution by the means for executing, and means for selecting pending instructions from the means for storing a plurality of issue queue entries to issue to the means for executing for execution in an execution order, the means for processing being configured to identify a speculation barrier instruction in the means for storing a plurality of commit queue entries; and a means for predicting an outcome of branch instructions according to one or more branch prediction data items;

in which:

while one of the plurality of commit queue entries identifies a speculation barrier instruction, in response to selecting, by the means for selecting, a branch instruction for issue that follows the speculation barrier instruction in the program order, the means for processing is configured to perform a first execution of the branch instruction, in which the first execution comprises the means for processing inhibiting updating of one or more branch prediction data items associated with the branch instruction and inhibiting the means for selecting from invalidating an issue queue entry identifying the branch instruction; and in response to completion of execution of the speculation barrier instruction, the means for processing is configured to perform a second execution of the branch instruction to update the one or more branch prediction data items associated with the branch instruction, the means for selecting being configured to invalidate the issue queue entry identifying the branch instruction in response to completion of the second execution.

* * * * *